United States Patent
Dattatri et al.

(10) Patent No.: US 11,748,229 B2
(45) Date of Patent: Sep. 5, 2023

(54) ADAPTIVE COLLECTION OF TELEMETRY DATA

(71) Applicant: DELL PRODUCTS, LP, Round Rock, TX (US)

(72) Inventors: Maheshwar Dattatri, Cedar Park, TX (US); Daniel L. Hamlin, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 168 days.

(21) Appl. No.: 17/308,579

(22) Filed: May 5, 2021

(65) Prior Publication Data

US 2022/0358025 A1    Nov. 10, 2022

(51) Int. Cl.
  *G06F 11/34*    (2006.01)
  *G06N 20/00*    (2019.01)
  *G06F 18/22*    (2023.01)
  *G06F 18/214*   (2023.01)

(52) U.S. Cl.
  CPC ...... *G06F 11/3438* (2013.01); *G06F 11/3409* (2013.01); *G06F 18/214* (2023.01); *G06F 18/22* (2023.01); *G06N 20/00* (2019.01)

(58) Field of Classification Search
  CPC ............. G06F 11/3438; G06F 11/3409; G06K 9/6215; G06N 20/00
  See application file for complete search history.

(56) References Cited

U.S. PATENT DOCUMENTS

| 10,073,753 | B2 | 9/2018 | Boyapalle et al. |
| 11,296,971 | B1* | 4/2022 | Jain .......................... H04L 41/22 |
| 11,516,308 | B1* | 11/2022 | Dubynskiy ............. H04L 67/12 |
| 2005/0182582 | A1* | 8/2005 | Chen ................... G06F 11/3495 |
| | | | 702/108 |
| 2020/0244704 | A1 | 7/2020 | Andrews et al. |

* cited by examiner

*Primary Examiner* — Manuel L Barbee (74) *Attorney, Agent, or Firm* — Larson Newman, LLP (57) ABSTRACT

An information handling system includes a memory and a processor. The memory stores telemetry data, telemetry collection rules, and persona classifications for the information handling system. The processor collects first telemetry data for the information handling system based on first telemetry collection rules. The first telemetry collection rules are set based on a first persona classification for the information handling system. The processor determines whether user behaviors change from behaviors associated with the first persona classification. In response to an amount of change in the user behaviors being above a threshold amount, the processor changes a classification of the information handling system from the first persona classification to a second persona classification. In response to the classification of the information handling system being the second persona classification, the processor collects second telemetry data for the information handling system based on second telemetry collection rules of the second persona classification.

20 Claims, 4 Drawing Sheets

ADAPTIVE COLLECTION OF TELEMETRY DATA

FIELD OF THE DISCLOSURE

The present disclosure generally relates to information handling systems, and more particularly relates to adaptive collection of telemetry data.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a that stores telemetry data, telemetry collection rules, and persona classifications for the information handling system. A processor may collect first telemetry data for the information handling system based on first telemetry collection rules. The first telemetry collection rules are set based on a first persona classification for the information handling system. The processor may determine whether user behaviors change from behaviors associated with the first persona classification. In response to an amount of change in the user behaviors being above a threshold amount, the processor may change a classification of the information handling system from the first persona classification to a second persona classification. In response to the classification of the information handling system being the second persona classification, the processor may collect second telemetry data for the information handling system based on second telemetry collection rules of the second persona classification.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
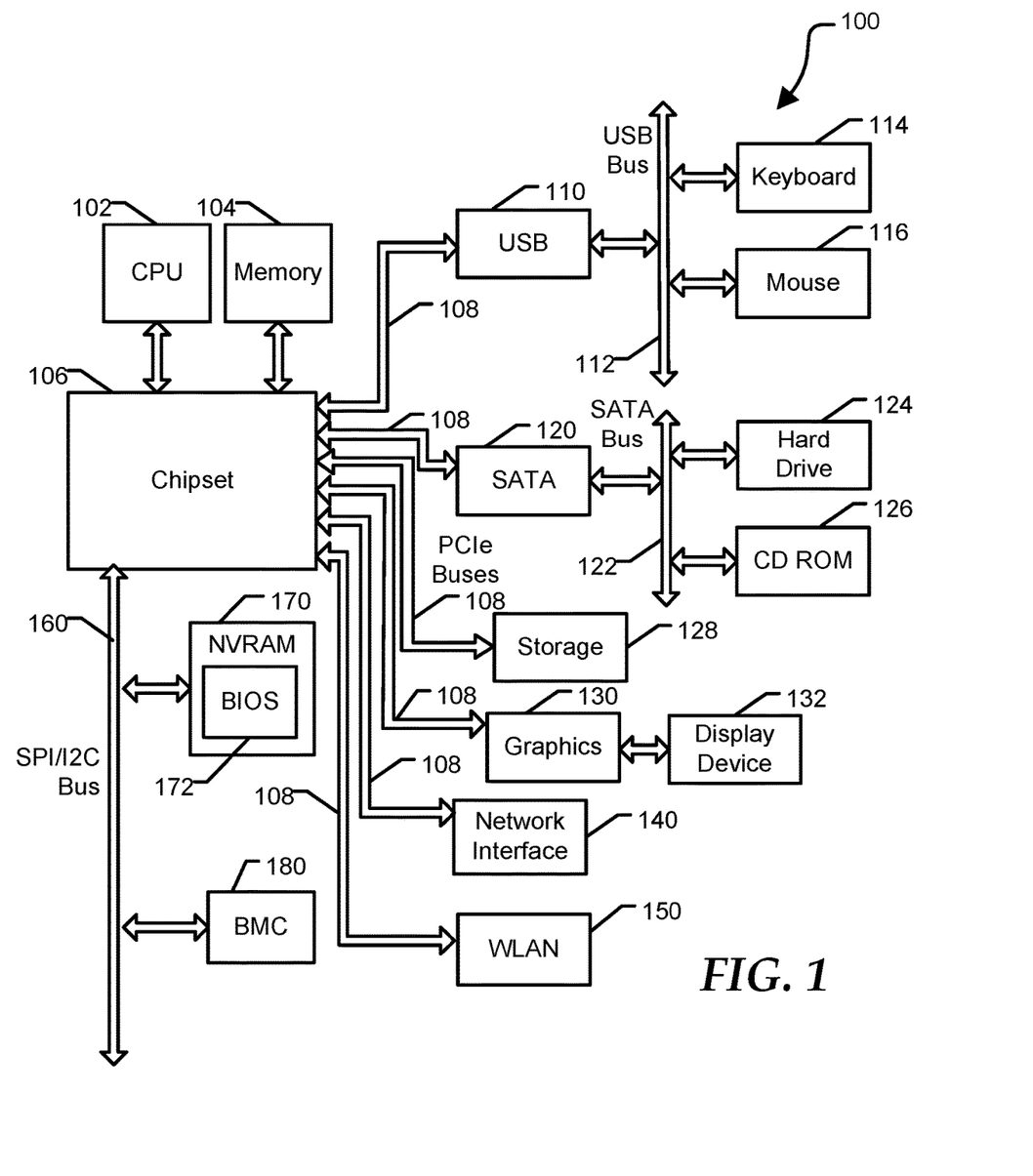
FIG. 1 is a block diagram of a general information handling system according to at least one embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a chipset 106, one or more PCIe buses 108, a universal serial bus (USB) controller 110, a USB bus 112, a keyboard device controller 114, a mouse device controller 116, a configuration a SATA bus controller 120, a SATA bus 122, a hard drive device controller 124, a compact disk read only memory (CD ROM) device controller 126, a storage 128, a graphics device controller 130, a network interface controller (NIC) 140, a wireless local area network (WLAN) or wireless wide area network (WWAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Figure 2:
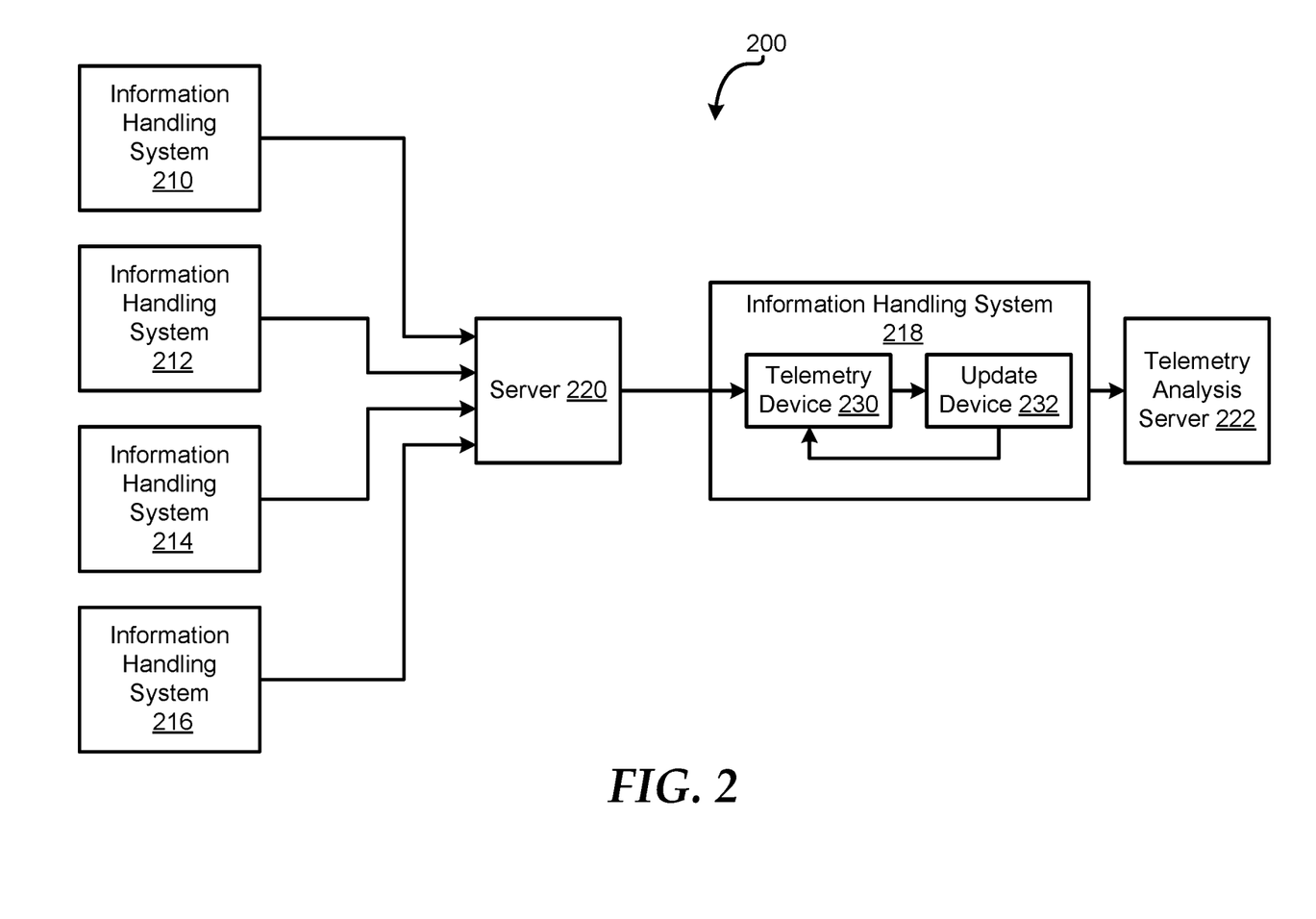
FIG. 2 is a block diagram of a portion of the system according to at least one embodiment of the disclosure.

In an example, information handling system 100 may be any suitable device including, but not limited to, information handling system 200 of FIG. 2. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

FIG. 2 illustrates a system 200 including multiple information handling systems 210, 212, 214, 216, and 218 (210-218), a server 220, and a telemetry analysis server 222 according to at least one embodiment of the disclosure. Information handling system 218 includes a telemetry device 230 and an update device 232. In an example, telemetry device 230 and update device 232 may be any suitable types of devices including, but not limited to, a processor devices. Server 220 may communicate with information handling systems 210-218 via a network. Server 220 may include any suitable number of components including, but not limited to, the components of information handling system 100 of FIG. 1. Similarly, each of information handling systems 210-218 may include any suitable number of components including, but not limited to, the components of information handling system 100 of FIG. 1. In an example, information handling system 218 may include additional components over those shown in FIG. 2 without varying from the scope of this disclosure. In certain examples, system 200 may include additional components over those shown in FIG. 2 without varying from the scope of this disclosure.

In an example, each of information handling systems 210-218 may collect telemetry data for one or more components in the information handling system. The telemetry data may be associated with any suitable components or operations of the information handling system including, but not limited to, the battery, CPU usage, HDD usage, software usage, and application usage. In certain examples, the ability of a particular information handling system to collect accurate and complete data may enable optimal experiences of individuals associated with the information handling system, such as one of information handling systems 210-218.

Previous information handling systems collect telemetry data associated with components of the information handling system. However, previous information handling systems may not target proper telemetry data and a significant amount of resources may be utilized to collect the telemetry data without targeted telemetry. Telemetry data collection in previous information handling systems may be set or rigid, such that the same telemetry data may be collected in the same manner across all information handling systems. Telemetry data collection in previous information handling systems may also create undue burdens on the information handling system with respect to system performance during runtime, battery impacts for telemetry collection, or the like. For example, collecting battery telemetry data while a user of the information handling system is in the middle of a gaming session may introduce audio glitches. In an example, an information handling system performing a deep system collection and distribution manner during audio/video/collaboration sessions may impact network transitions and reduce performance. In previous information handling systems, the collection of repeated telemetry data for specific components which do not frequently change for that user is not efficient utilization of resources in the information handling system when duplicate information is delivered. In certain examples, information handling system 218, server 220, and other devices within system 200 may improve any information handling system by improving the collection of telemetry data. For example, an information handling system may be improved by utilizing classification methods to create and arbitrate between multiple manners of telemetry collection and distribution.

In an example, server 220 may execute any suitable operations including, but not limited to, an off host service to perform ongoing persona classification routines to modify persona classifications and identify new telemetry collections rules in a learned manner. For example, server 220 may implement a machine learning system, such as machine learning system 300 of FIG. 3, to create classifications for user personas. Server 220 may then provide the persona classifications to one or more of information handling systems 210-218 via any suitable format. For example, data for the persona classifications may be provided by Unicode Transformation Format (UTF) or the like. One or more components of information handling system 218 may utilize the persona classifications and associated collection rules to collect telemetry data for the information handling system.

During operation of system 200, server 220 may receive or collect data for profile and persona creation from multiple existing telemetry systems, such as information handling systems 210-216. In an example, the data from the existing telemetry systems may indicate profiles for different personas. For example, the data may indicate one or more profiles associated with a particular persona, and one or more profiles associated with another persona. In certain examples, one or more usage profiles may be associated with more than one persona classifications. As used herein, usage profiles and user behaviors may both identify how a user utilizes an information handling system. In an example, usage profiles may be any suitable component usages in an information handling system including, but not limited to, performance focused usage, trust and security based usage, visually immersive usage, mobility focused usage, adverse condition usage, and highly connected usage. In certain examples, the personas may be any suitable user category including, but not limited to, a developer, a knowledge worker, a gamer, an executive, entertainment user, an information technology (IT) administrator user, and an industry specialized user. In response to receiving the data from existing telemetry systems, server 220 may create and train one or more classification machine learning models, such as machine learning system 300 of FIG. 3.

Figure 3:
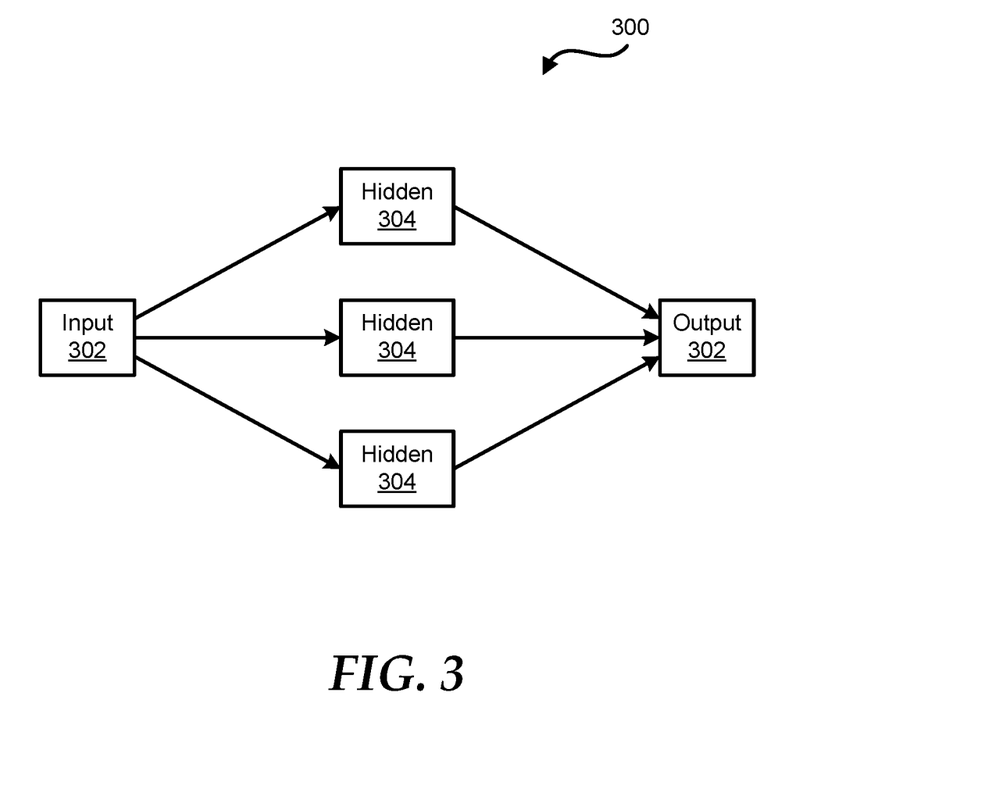
FIG. 3 is a block diagram of a machine learning system according to at least one embodiment of the disclosure.

FIG. 3 illustrates machine learning system 300 according to at least one embodiment of the disclosure. Machine learning system 300 includes an input layer 302, one or more hidden layers 304, and an output layer 306. Input layer 302 may receive any suitable data associated with the usage profiles or user behaviors for a particular persona of an information handling system and provide this data to hidden layers 304. Hidden layers 304 may perform one or more operations on the input data, such as the usage profiles, and determine a corresponding persona classification for the information handling system. The persona classification and associated classification rules may be provided by output layer 306.

During training of machine learning system 300, the training of hidden layers 304 may be performed in any suitable manner including, but not limited to, supervised learning, unsupervised learning, reinforcement learning, and self-learning. In an example, the training data may include any suitable data including, but not limited to, usage profile data for different personas, which may be provided to input layer 302 on a persona-by-persona basis. For example, a first set of data provided to input layer 302 may include one or more usage profiles and a persona classification associated with the one or more usage profiles, and a second set of data may include usage profiles and an associated persona classification. In certain examples, a particular usage profile may be associated within more than one persona classification. In this example, hidden layers 304 may utilize the profiles and associated personas to learn usage profiles for each persona type. Based on the training data from existing telemetry systems, such as information handling systems 210-216, server 220 may create multiple machine learning models and each machine learning model may be associated with a different persona classification. In response to server 220 building or creating the different machine learning persona classification models, the server may provide these models to any information handling system, such as information handling system 218 of FIG. 2.

Referring back to FIG. 2, information handling system 218 may receive the machine learning models from server 220 and may perform one or more operations to collect targeted telemetry data based on a determined persona classification. In certain examples, information handling system 218 may perform one or more operations to determine a persona classification and associated classification rules for the information handling system. For example, telemetry device 230 may run local diagnostics to collect telemetry data for a particular amount of time before a persona classification is determined for information handling system 218. In certain examples, the telemetry data for information handling system 218 may include any suitable usage data including, but not limited to, wide wireless area network (WWAN) telemetry, virtual private network (VPN) telemetry and usage patterns, and CPU and other hardware probes. In certain examples, WWAN telemetry may be indicative of an on-the-go use of information handling system 218, VPN telemetry may indicate security usage of the information handling system, and the CPU and other hardware probes may indicate a type of use. In an example, the collected telemetry data may be processed with a clustering algorithm to cluster the telemetry data into one or more clusters or usage profiles. In an example, the usage profiles of information handling system 218 may include highly connected usage, secure usage, and mobile usage profiles.

In certain examples, the particular amount of time for running the local diagnostics may be any suitable number of days including, but not limited to, fifteen days, twenty days, thirty days, fifty days, and sixty days. During this amount of time, telemetry device 230 may provide the diagnostics data to update device 232. In an example, update device 232 may utilize the data from telemetry device 230 to map information handling system 218 to a persona classification.

In an example, information handling system 218 may be mapped in a persona classification in any suitable manner. For example, update device 232 may utilize a classification algorithm to group usage profiles. In certain examples, any suitable clustering algorithm may be utilized including, but not limited to, a naïve Bayes clustering algorithm may be implemented to group the clusters of data points into classes of historical entitlements. Skilled practitioners of the art will be familiar with naïve Bayes classifiers, which are a family of probabilistic classifiers commonly implemented when applying Bayes' theorem with strong, or naïve, independence assumptions between features. In an example, the clustering may be utilized to cluster or group the diagnostic data into one or more groups or usage profiles.

In an example, another clustering algorithm, such as a K-means clustering algorithm, may be implemented to map the clusters of usage profiles to a persona. As used herein, K-means clustering broadly refers to a method of vector quantization commonly used for cluster analysis in data mining. Skilled practitioners of the art will be aware that k-means clustering is commonly used to partition n observations into k clusters, in which each observation belongs to the cluster with the nearest mean, thereby serving as a prototype of the cluster.

In certain examples, the K-means algorithm may be implemented to determine a first cluster by taking a centroid based a number of similar usages or user behaviors. As used herein, a centroid, also known as a geometric center, broadly refers to the arithmetic mean position of all points within a plain figure, such as a cluster of data points produced by the implementation of a K-means clustering algorithm. In certain examples, the first cluster determined by the K-means algorithm may correspond to a particular usage profile. In an example, the clustering of usage profile may indicate a strong association to connected, secure, and mobile usage profiles, and these clustered usage profiles may be provided to machine learning system 300.

Referring back to FIG. 3, during execution of machine learning system 300, input layer 302 may receive the clustered usage profiles and provide the usage profiles to hidden layers 304 in any suitable manner. Hidden layers 304 may then perform one or more suitable operations to determine or map the clustered profiles to a particular persona. Output layer 306 may provide the persona classification for information handling system 218, such as an executive persona.

Referring back to FIG. 2, in response to information handling system 218 being mapped to a particular persona classification, telemetry device 230 may utilize one or more collection rules associated with the assigned persona classification to adaptively collect proper telemetry data. In an example, the collection rules may control any aspect of how telemetry data is collected. For example, the collection rules or policy may identify a cadence of collection, a priority, telemetry data to be collected, how data is collected, granularity of collection, identity of collections, payload size, sampling algorithm, privacy, compression, security, or the like. In an example, the cadence of collection may indicate how often the telemetry data is collected, the priority may indicate whether the telemetry data collected may be deferred or is collected real time, the privacy may indicate how much protection is needed for the telemetry data, and the security may indicate a type of encryption for the data. In an example, the collection rules for an executive persona classification may be as follows: cadence may be not often or once a week; priority may be to defer collection; data collected may be connectivity and security events data; the granularity may be an aggregated view; the identity of collection may be a two factor authentication; the payload size may be a minimum under one Kilobyte; the sampling may be adaptive sampling algorithm; the privacy may be extra controls; the compression may be highly compressed; and the security may be AES encryption.

In response to telemetry device 230 collecting the telemetry data based on the collection rules, information handling system 218 may send the targeted telemetry data to a back-end server for analysis. For example, the back-end server may utilize the telemetry data from information handling system 218 to determine whether any updates should be provided to the information handling system. In an example, telemetry device 230 may continue to collect the telemetry data based on the collection rules for the assigned persona classification for any particular amount of time.

In an example, server 220 or update device 232 may track the user behaviors or usage profiles, and may periodically detect changes in the user behaviors or usage profiles for information handling system 218. The determination of changes in user behaviors or usage profiles may be performed by either server 220 or update device 232. For brevity and clarity these operations will be described only with respect to update device 232. Update device 232 may determine whether user behaviors or usage profiles for information handling system 218 have changed above a threshold amount as compared to the usage profiles for a current assigned persona classification of the information handling system. If so, update device 232 may perform one or more suitable operations to re-classify the persona classification for information handling system 218 from the current persona classification to a different persona classification.

In an example, update device 232 periodically perform the persona re-classification to ensure the collected telemetry data for information handling system 218 is adapted to current user behaviors or usage profiles. In certain examples, update device 232 may perform one or more operations to determine whether to re-classify the persona classification. For example, update device 232 may determine a degree of association between usage profiles of information handling system 218 and a current assigned persona classification for the information handling system. In an example, update device 232 may utilize any suitable data to determine the degree of association including, but not limited to, data how many usage profile clusters of information handling system 218 directly correspond to the current persona classification.

In an example, a determination of a time period between the periodic re-classifications may be based on the association between the usage of information handling system 218 and the current persona classification. In certain examples, a weight may be assigned to the current persona classification based on the degree of association. In different examples, the weight assigned to the persona classification may change either directly proportional or inversely proportional to a closeness of the degree of association. In an example, the stronger the connection or association between the usage of information handling system 218 and the current persona classification, the longer the time period between determinations of re-classification.

When the time period between the periodic re-classifications has expired, the machine learning model may be retrained and a determination may be made whether a new cluster of usage profiles, such as a new persona classification, is better than the current persona classification for the current user behavior or usage of information handling system 218. If so, the persona classification for information handling system 218 may be changed to the new persona classification. In certain examples, the re-classification may be performed in update device 232 or in server 220 without varying from the scope of this disclosure. Based on the re-classification of the persona, classification rules may adapt the telemetry data collected for information handling system 218 to be directed to attributes or data associated with the new persona classification. The attributes may also be collected with a proper granularity level based on collection rules for the persona classification of information handling system 218.

Figure 4:
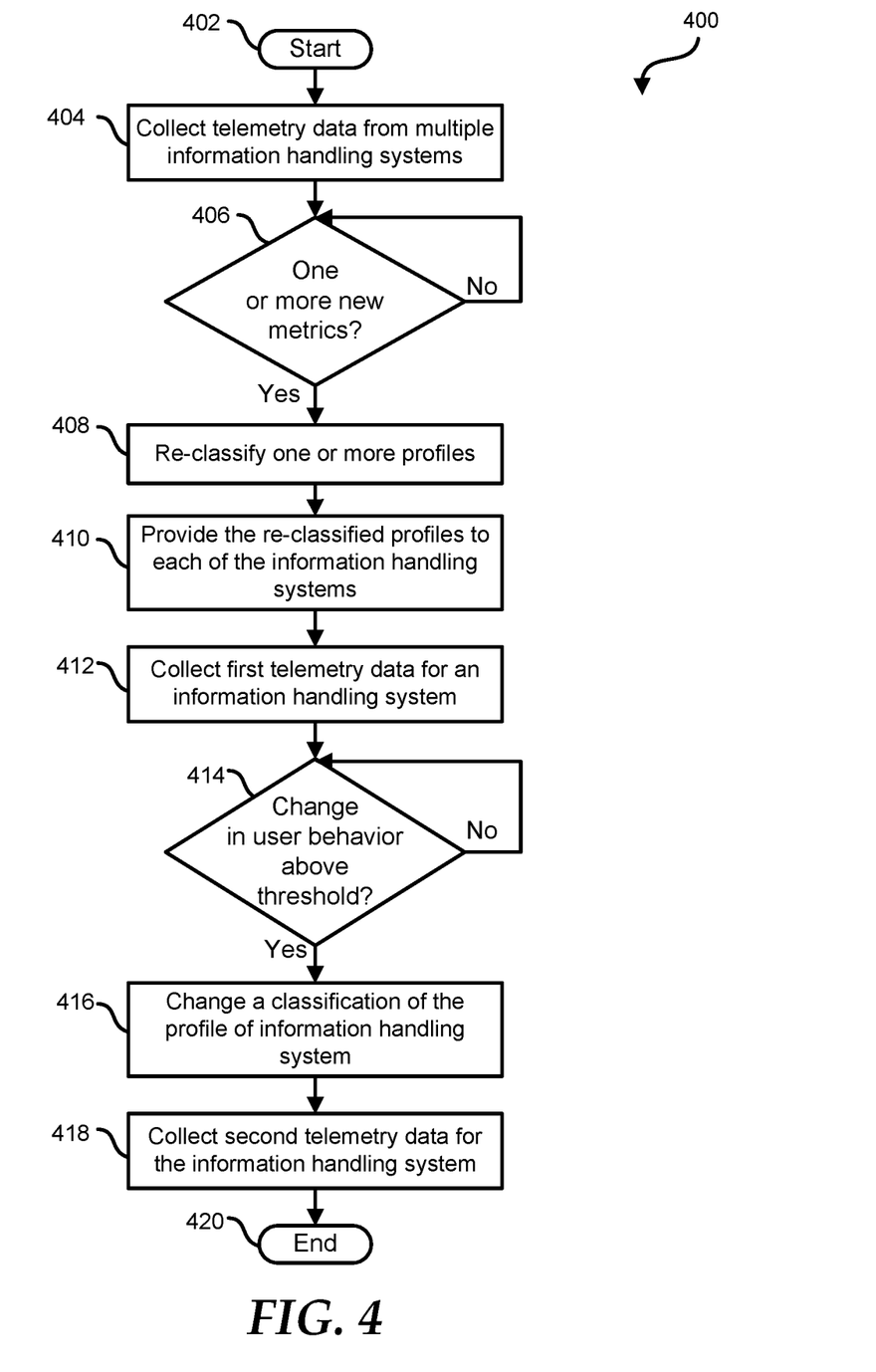
FIG. 4 is a flow diagram of a method for adapting collection of telemetry data in an information handling system based on changes in user behaviors according to at least one embodiment of the current disclosure according to at least one embodiment of the current disclosure.

FIG. 4 illustrates a method 400 for adapting collection of telemetry data in an information handling system based on changes in user behaviors according to at least one embodiment of the current disclosure, starting at block 402. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, by information handling system 100 depicted in FIG. 1, information handling system 200 depicted in FIG. 2, or any other type of system, controller, device, module, processor, or any combination thereof, operable to employ all, or portions of, the method of FIG. 1.

At block 404, telemetry data for different personas is collected from multiple information handling systems. In an example, a server may collect the telemetry data from the information handling systems, which may be existing telemetry systems. The telemetry data may include any suitable data including, but not limited to, data indicating usage profiles for different persona classifications. For example, the data may indicate one or more profiles associated with a particular persona, and one or more profiles associated with another persona. In certain examples, one or more usage profiles may be associated with more than one persona classifications.

At block 406, a determination is made whether one or more new metrics for the telemetry of the persona classifications have been detected. In response to the new metrics for the telemetry of the personas being detected, the one or more persona classifications are re-classified at block 408. In an example, the re-classification of one or more personas may be performed in any suitable manner including, but not limited to, a machine learning system receiving the new metrics or usage profiles, performing one or more operations, and outputting the re-classification of the personas. At block 410, the re-classified personas are provided to each of the information handling systems.

At block 412, first telemetry data for the information handling system is collected based on first telemetry collection rules. In an example, the first telemetry collection rules may be set based on a first persona classification for the information handling system. At block 414, a determination is made whether an amount of changes in user behaviors from behaviors associated with the first persona classification are above a threshold amount. In an example, the determination may be whether user behaviors or usage profiles for the information handling system have changed above a threshold amount as compared to the usage profiles for a current assigned persona classification of the information handling system.

In response to the amount of changes being above the threshold amount, a classification of the information handling system is changed from the first persona classification to a second persona classification at block 416. In an example, one or more suitable operations may be performed to re-classify the persona classification for the information handling system from the first persona classification to the second persona classification. At block 418, second telemetry data for the information handling system is collected based on second telemetry collection rules of the second persona classification, and the flow ends at block 420.

Referring back to FIG. 1, the information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a memory to store first and second telemetry data, telemetry collection rules including first and second sets of telemetry collection rules, and persona classifications; and
   a processor to communicate with the memory, the processor to:
      collect the first telemetry data for the information handling system based on the first set of telemetry collection rules, wherein the first set of telemetry collection rules are set based on a first persona classification for the information handling system;
      determine whether user behaviors change from behaviors associated with the first persona classification;
      in response to an amount of change in the user behaviors being above a threshold amount, change a classification of the information handling system from the first persona classification to a second persona classification; and
      in response to the classification of the information handling system being the second persona classification, collect the second telemetry data for the information handling system based on the second set of telemetry collection rules of the second persona classification.

2. The information handling system of claim 1, wherein the processor further to:
   identify one or more usage profiles associated with the information handling system;
   determine a persona type of an end user of the information handling system; and
   determine the second persona classification based on the identified personas usage profiles and the persona type of the end user.

3. The information handling system of claim 2, wherein each of the usage profiles is mapped to a different major consumption pattern of the information handling system.

4. The information handling system of claim 2, wherein the processor further to:
   determine a degree of association between the first persona classification and a cluster of usage profiles associated with the information handling system;
   assign a weight to the degree of association, wherein a higher weight is assigned to a closer degree of association; and
   determine an amount of time between retraining of a machine learning model based on the weight of the degree of association, wherein the amount of time increases in proportion to an increase of the weight of the degree of association.

5. The information handling system of claim 4, wherein the machine learning model determines the second persona classification.

6. The information handling system of claim 4, wherein prior to the determination of whether user behaviors change from behaviors associated with the first persona classification, the processor further determines whether a particular amount of time has expired, wherein the particular amount of time is associated with the degree of association.

7. The information handling system of claim 1, wherein the first telemetry data is collected for a first set of attributes and the second telemetry data is collected for a second set of attributes.

8. The information handling system of claim 1, wherein the first persona classification is determined based on usages and behaviors of an individual utilizing the information handling system.

9. A method comprising:
   collecting, by a processor of an information handling system, first telemetry data for the information handling system based on first telemetry collection rules, wherein the first telemetry collection rules are set based on a first persona classification for the information handling system;
   determining whether user behaviors change from behaviors associated with the first persona classification;
   in response to an amount of change in the user behaviors being above a threshold amount, changing a classification of the information handling system from the first persona classification to a second persona classification; and
   in response to the classification of the information handling system being the second persona classification, collecting second telemetry data for the information handling system based on second telemetry collection rules of the second persona classification.

10. The method of claim 9, further comprising:
    identifying one or more usage profiles associated with the information handling system;
    determining a persona type of an end user of the information handling system; and
    determining the second persona classification based on the identified usage profiles and the persona type of the end user.

11. The method of claim 10, wherein each of the usage profiles is mapped to a different major consumption pattern of the information handling system.

12. The method of claim 10, further comprising:
    determining a degree of association between the first persona classification and a cluster of usage profiles associated with the information handling system;

assigning a weight to the degree of association, wherein a higher weight is assigned to a closer degree of association; and determining an amount of time between retraining of a machine learning model based on the weight of the degree of association, wherein the amount of time increases in proportion to an increase of the weight of the degree of association.

13. The method of claim 12, further comprising:
determining, by the machine learning model, the second persona classification.

14. The method of claim 12, wherein prior to the determining of whether user behaviors change from behaviors associated with the first persona classification, the method further comprises:
determining whether a particular amount of time has expired, wherein the particular amount of time is associated with the degree of association.

15. The method of claim 9, wherein the first telemetry data is collected for a first set of attributes and the second telemetry data is collected for a second set of attributes.

16. The method of claim 9, wherein the first persona classification is determined based on usages and behaviors of an individual utilizing the information handling system.

17. A method comprising:
collecting telemetry for personas from multiple information handling systems;
determining one or more new metrics for the telemetry for the personas;
based on the determined new metrics, re-classifying one or more personas;
providing the re-classified personas to each of the information handling systems;
collecting, by a processor of a first information handling system of the information handling systems, first telemetry data for the first information handling system based on first telemetry collection rules, wherein the first telemetry collection rules are set based on a first persona classification for the first information handling system;
determining whether user behaviors change from behaviors associated with the first persona classification;
in response to an amount of change in the user behaviors being above a threshold amount, changing a classification of the first information handling system from the first persona classification to a second persona classification; and
in response to the classification of the information handling systems being the second persona classification, collecting second telemetry data for the information handling system based on second telemetry collection rules of the second persona classification.

18. The method of claim 17, further comprising:
identifying one or more usage profiles associated with the first information handling system;
determining a persona type of an end user of the first information handling system; and
determining the second persona classification based on the identified usage profiles and the persona type of the end user.

19. The method of claim 18, further comprising:
determining a degree of association between the first persona classification and a cluster of usage profiles associated with the first information handling system;
assigning a weight to the degree of association, wherein a higher weight is assigned to a closer degree of association; and
determining an amount of time between retraining of a machine learning model based on the weight of the degree of association, wherein the amount of time increases in proportion to an increase of the weight of the degree of association.

20. The method of claim 17, wherein the first telemetry data is collected for a first set of attributes and the second telemetry data is collected for a second set of attributes.

* * * * *

UNITED STATES PATENT AND TRADEMARK OFFICE
CERTIFICATE OF CORRECTION

| | |
|---|---|
| PATENT NO. | : 11,748,229 B2 |
| APPLICATION NO. | : 17/308579 |
| DATED | : September 5, 2023 |
| INVENTOR(S) | : Maheshwar Dattatri et al. |

Page 1 of 1

It is certified that error appears in the above-identified patent and that said Letters Patent is hereby corrected as shown below:

In the Claims

Column 11, Line 66: In Claim 2, Please change "identified personas usage profiles" to --identified usage profiles--

Signed and Sealed this
Eleventh Day of February, 2025

Coke Morgan Stewart
*Acting Director of the United States Patent and Trademark Office*